(No Model.)

P. P. BRADLEY
HYDRANT CASING.

No. 403,639. Patented May 21, 1889.

Witnesses:
E. L. Smith
A. J. Stewart

Inventor,
Patrick P. Bradley,
by
Church & Church
his Attorneys

UNITED STATES PATENT OFFICE.

PATRICK P. BRADLEY, OF HARRISBURG, PENNSYLVANIA.

HYDRANT-CASING.

SPECIFICATION forming part of Letters Patent No. 403,639, dated May 21, 1889.

Application filed February 11, 1889. Serial No. 299,392. (No model.)

*To all whom it may concern:*

Be it known that I, PATRICK P. BRADLEY, of Harrisburg, in the county of Dauphin and State of Pennsylvania, have invented certain new and useful Improvements in Hydrant-Casings; and I do hereby declare the following to be a full, clear, and exact description of the same, reference being had to the accompanying drawings, forming a part of this specification, and to the figures and letters of reference marked thereon.

Difficulties have heretofore been encountered in the production of a hydrant-casing which will combine the quality of durability with lightness and strength and yet be capable of being easily and quickly set in position, owing partly to the various detrimental influences brought to bear upon it when set, caused by the freezing and thawing of the soil around its base, the freezing of the water in the pipes, or that which escapes from the same and freezes around or within the casing, or to the deteriorating influences of the elements, causing the casing to rot if of wood and to corrode and be destroyed if of ordinary cast-iron, and also owing partly, when they are of cast-iron, to the extremely rough handling they receive in transit or while being stored, resulting in the breaking and destruction of many, as in order to be of such weight as to render them at all portable and convenient they of necessity have very thin walls, and in many the walls have large apertures left therein to render the casings lighter.

My invention has for its object to produce a hydrant-casing in a large measure free from the defects above pointed out; to which ends it consists, broadly stated, in such a casing struck up in halves from sheet metal with means for securing the halves together; and it further consists in certain novel details of construction and combinations and arrangements of parts, to be hereinafter described, and pointed out particularly in the claims at the end of this specification.

Figure 1:
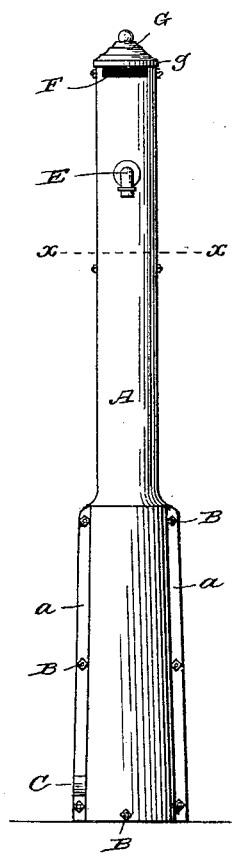
Figure 2:
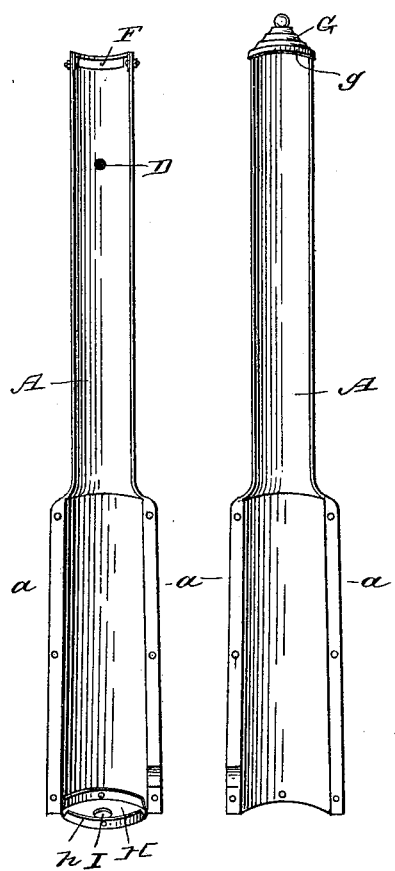
Figure 3:
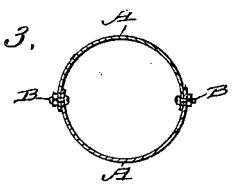

In the accompanying drawings, Figure 1 is a front elevation of a casing constructed in accordance with my invention. Fig. 2 is a view of the interior of the two halves. Fig. 3 is an enlarged section on the line $x\,x$, Fig. 1.

Similar letters refer to like parts.

The casing is formed in two halves, A A, struck up from sheet metal of a durable and lasting quality, and preferably galvanized or coated with a non-corrosive cover, particularly the base portion, which is adapted to be set in the ground.

The base portion is formed of relatively large area, tapering from bottom to top to prevent the casing from being "heaved" by the frost or otherwise displaced, owing to unequal or varying earth-pressure, as all such pressure will tend to work the casing down instead of up out of the ground. At the sides the halves of the base-section are provided with flanges $a$, which strengthen and render the same more rigid, and through these flanges are passed screw-bolts B or other preferred form of fastening devices for uniting the two halves.

Near the extreme lower end a semicircular depression, C, is formed in each half, through which the water or service pipe enters, this depression being of course so formed as that when the parts are brought together they will form a circular opening.

Above the base-section the diameter of the casing is reduced materially and the radially-projecting side flanges left off, so that the casing will be circular, slightly tapering upward to present a symmetrical appearance, and to afford a lapped portion through which to pass the fastening devices or bolts for uniting the halves the edges of the halves may be extended in the direction of the circumference of the casing, so as to present, when the parts are united, a practically smooth joint, and yet possess the necessary rigidity and firmness to resist lateral pressure.

The opening D is formed at the proper point for the passage of the spout E, which may be secured to the casing by the usual clamps and connected to the service-pipe from below, and the opening F is formed above said spout for the passage of the handle controlling the regulating-valve within the casing.

The cover or cap G is also preferably formed of sheet metal, being struck or spun into proper circular shape with the depending flange $g$ for fitting down over the casing to afford a lapped portion, through which fastening devices may be inserted, if desired.

To give additional strength to the base of the casing, and also a bearing for the service-pipe, a bottom, H, is inserted, the flange h permitting the same to be secured in position, as will be readily understood, and a hole, I, is preferably formed in the center for holding the stop-cock in place.

The advantages of this structure are at once apparent, and it sufficeth to say that as the whole casing is made of wrought metal it may be extremely thin without danger of breaking, and by reason of its circular shape is in the best form to afford the necessary lateral strength both to resist lateral pressure above the ground and the crushing strain brought to bear on the base-section below the ground, and finally presents an extremely pleasing and regular appearance.

It will be seen, also, that an advantage of the structure not incident to others is that it can be taken apart by the workmen when necessary to insert the fixtures and again put together without any great trouble.

It is obvious that various of the unessential details of construction may be altered or changed without departing from the spirit of my invention, and that any sheet wrought iron or steel may be used, if desired.

Having thus described my invention, what I claim as new is—

1. In a hydrant-casing formed in halves, the combination, with the cylindrical or regular upper part and the base-section tapering from the bottom upward, of the extended flanges on the base-section for uniting the halves, substantially as described.

2. In a hydrant-casing formed in halves, the combination, with the base-section having the extended flanges, of the top formed integral therewith of substantially circular form, with the lapping extensions or flanges, substantially as and for the purpose set forth.

PATRICK P. BRADLEY.

Witnesses:
M. W. JACOBS,
FREDERICK M. OTT.